United States Patent Office 2,892,859
Patented June 30, 1959

2,892,859

FLUORINE-CONTAINING ALKOXY-ALKYLSILANES

Earl T. McBee, West Lafayette, Ind., and Ogden R. Pierce, Midland, Mich., assignors, by mesne assignments, to Research Corporation, New York, N.Y., a corporation of New York No Drawing. Application May 20, 1955
Serial No. 510,045

9 Claims. (Cl. 260—448.8)

This invention relates to flourine-containing alkoxy-alkylsilanes, and is more particularly concerned with those alkoxyalkylsilanes where the fluorine is present as a lower-perfluoroalkyl group which is substituted in the alkoxy group.

The novel compounds of the present invention may be illustrated by the following formula:

$$(XR_1O)_n Si(R)_{4-n}$$

wherein $n$ represents the integer 2 or 3, X represents a lower-perfluoroalkyl group, $R_1O$ represents lower-alkenoxy and R represents alkyl. Among the perfluoroalkyl groups represented by X are those having from one to about eight carbon atoms. Among the lower-alkenoxy groups represented by $R_1O$ are those having from one to about five carbon atoms.

The compounds of the present invention are liquids at room temperature, having boiling points from about 100 degrees centigrade to about 200 degrees centigrade. They are useful as snuffer agents and lubricant additives.

The compounds of the present invention can be prepared by the reaction of a tetrakis-(lower-perfluoroalkyl substituted lower-alkoxy)silane and a Grignard reagent. The reaction is preferably conducted in the presence of a solvent inert under the reaction conditions and reactants employed, such as ethyl ether or 1,4-dioxan, since the reaction is easier to control when solvent is employed. When the Grignard reagent used is the iodide, and approximately equimolar amounts of the reactants are employed, two reaction products may be formed, the monoalkyl and the dialkyl compounds, with a higher yield of the monoalkyl. When the Grignard reagent used is the bromide and the molar ratio of the tetraalkoxysilane to Grignard is about ten to three or four, the reaction product is the monoalkyl compound. When the Grignard reagent used is the chloride and the molar amounts of the reactants are about the same, the reaction product is the monoalkyl compound. Higher yields are usually obtained with the chloride or bromide Grignard reagent than with the iodide.

The compounds of the present invention may also be prepared by the reaction of three moles of a perfluoroalkyl-substituted alcohol and one mole of an alkylchlorosilane. The course of the reaction is followed by measuring the amount of hydrogen chloride evolved. This method results in relatively high yields.

The following examples indicate methods by which members of the new group of compounds may be prepared, but are in no way to be construed as limiting the invention thereto.

PREPARATION 1—ISOPROPYLTRICHLOROSILANE

The Grignard reagent, isopropylmagnesium chloride, was formed in a one-liter flask by covering 24.3 grams (1 gram atom) of magnesium with approximately 100 milliliters of anhydrous ether. To this was added 110 grams (1.4 moles) of isopropyl chloride over a period of three hours, together with about 200 milliliters of anhydrous ether. The solution of the magnesium required an additional seven hours of stirring at reflux temperature. Into another three-necked, one-liter flask fitted with a sintered glass filtering addition funnel, a stirrer and a Vigreux column was placed 331 grams (1.95 moles) of silicon tetrachloride, which had been dissolved in two pounds of anhydrous ether. The isopropyl magnesium chloride was forced over into the filtering addition funnel under nitrogen pressure and was added dropwise to the stirring silicon tetrachloride-ether solution. The addition was very slow, requiring sixteen hours. The Grignard reacted with an immediate precipitation of magnesium chloride. The ether was removed from the reaction mixture by distillation through the Vigreux column. After sufficient of the ether had been recovered so that stirring was no longer possible, the Vigreux column was removed and the remaining liquid was removed by vacuum distillation and condensation with Dry-Ice. The products were rectified. There was thus obtained 93.4 grams (about 53 percent of the theoretical yield) of isopropyltrichlorosilane, boiling at 118 degrees centigrade.

PREPARATION 2—TETRAKIS-(2,2,2-TRIFLUOROETHOXY)SILANE

The synthesis of the silicate esters of the fluorinated alcohols was usually conducted in a round bottom flask, but a three-necked flask possesses the advantages of a thermometer well and an inlet for the nitrogen stream. The flask was connected to a Y tube carrying the addition burette and a water condenser surmounted by a Dry-Ice condenser which was connected to the absorbing flask for the hydrogen chloride through a calcium chloride tube. The absorbing flask, containing distilled water, was always surrounded by ice water, but the evolution of hydrogen chloride was sometimes measured by the addition of solid sodium hydroxide with indicators.

The apparatus was flushed with nitrogen while heated with an infrared lamp. Silicon tetrachloride (125.6 grams, 0.739 mole) was distilled into the burette, and trifluoroethanol (356.9 grams, 3.57 moles) was distilled from Drierite into the reaction flask. The silicon tetrachloride was added dropwise to the refluxing alcohol over a period of two hours and thirteen minutes, and the solution was refluxed for an additional two hours while a stream of nitrogen passed through the apparatus. The absorbing flask gained 107.2 grams in weight and the reaction flask gained 17 grams, for a total of 124.2 grams gained (compared to the 125.6 grams of silicon tetrachloride used. There was obtained 286.3 grams (91.4 percent of the theoretical yield) of tetrakis-2,2,2-(trifluoroethoxy)silane, boiling at 165–166 degrees centigrade/749.6 mm. by fractional distillation of the mixture.

*Example 1.—Bis-(2,2,2-trifluoroethoxy)dimethylsilane and Tris-(2,2,2-trifluoroethoxy)methylsilane*

Into a one-liter, three-necked flask fitted with a dropping funnel, a true-bore Herschberg stirrer and a reflux condenser connected to a source of nitrogen was placed 2.5 grams (0.013 gram atom) of magnesium. The magnesium was then covered with 300 milliliters of anhydrous ether and 45.4 grams (0.107 mole) of tetrakis-(2,2,2-trifluoroethoxy)silane. During a period of forty-five minutes seventeen grams (0.12 mole) of methyl iodide dissolved in 50 milliliters of ether was added dropwise into the reaction flask. After stirring until a homogeneous solution was formed, the reaction mixture was allowed to stand for two days. The ether was then stripped through a Vigreux column while being heated with steam. The distillation was continued under reduced pressure. After a trace of ether was removed, a material came over at 50–54 degrees centigrade/7 mm. When the material remaining in the flask had reached a semi-solid state a sudden surge of vapor was evident along with the fumes of iodine. A large amount of this vapor passed through the system. The flask contained considerable carbonaceous material and 28.5 grams of liquid was obtained from the receiver and the Dry-Ice trap. This liquid was distilled from zinc dust to remove iodine and the condensate was rectified on a Todd column. There was thus obtained 0.6 gram (about two percent of the theoretical yield) of bis-(2,2,2-trifluoroethoxy)dimethylsilane, boiling at about 112–114 degrees centigrade and 3.0 grams (about 14.4 percent of the theoretical yield) of tris-(2,2,2-trifluoroethoxy)methylsilane, boiling at about 142–145 degrees centigrade.

*Example 2.—Tris-(2,2,2-trifluoroethoxy)methylsilane*

Methyl magnesium bromide was formed under a nitrogen atmosphere in a 500-milliliter, three-necked flask fitted with a ball joint sealed Hershberg stirrer, a gas inlet tube and a Dry-Ice condenser, using 3.5 grams (0.14 gram atom) of magnesium, covering the magnesium with 150 milliliters of ether and passing 34 grams (0.36 mole) of methyl bromide gas into the reaction flask at a rate sufficient for gentle reflux. The magnesium was completely in solution after sixty-five minutes. The Dry-Ice condenser was then replaced with a siphon connecting to the combined filtering and addition funnel and the Grignard forced over into the latter by nitrogen pressure. (This addition funnel consisted of a sintered glass filtering funnel connected to the outer part of a 45/50 standard tapered joint; the outlet of the funnel was connected to a stopcock and a 24/40 joint; the top of the 45/50 joint was sealed to a 24/40 joint which connected to a sidearm for pressure release and a ball joint for connection with a siphon tube.)

Tetrakis-(2,2,2-trifluoroethoxy)silane (61.8 grams, 0.99 mole) was heated in a one-liter, three-necked flask fitted with a filtering funnel, a true-bore Hershberg stirrer and a Vigreux column. The silane, heated to about 100 degrees centigrade, was added dropwise under a slight nitrogen pressure to the Grignard with ether being driven off. The addition of the heated silane required two hours and forty-five minutes. The evolution of the ether ceased after an additional two hours and fifteen minutes of heating. The heating of the silane and Grignard was continued for twenty hours. The reaction flask was then fitted with a distilling head condenser and receiver. The flask was allowed to cool and the pressure was lowered to 5 millimeters with the receiver being cooled in Dry-Ice. The ether was removed by distillation at room temperature. The reaction mixture was distilled between 22 degrees centigrade and 41 degrees centigrade. The last traces of liquid were removed from the reaction flask by the application of a heating lamp under which some of the unreacted Grignard started to sublime and the distillation was stopped. The condensate was then rectified. There was thus obtained 21.8 grams (approximately 44 percent of the theoretical yield) of tris-(222-trifluoroethoxy)methylsilane, boiling at about 145 degrees centigrade/740 mm., having a refractive index of 1.3120.

*Analysis.*—Calculated for $(CF_3CH_2O)_3SiCH_3$: C, 24.63; H, 2.64. Found: C, 24.90; H, 2.81.

*Example 3.—Tris-(2,2,2-trifluoroethoxy)isopropylsilane*

Using the apparatus of Example 2, isopropyl magnesium chloride was prepared by covering five grams (0.205 gram atom) of magnesium with 109 grams of anhydrous ether in the 500-milliliter flask and adding 18.5 grams (0.24 mole) of isopropyl chloride in a dropwise manner over about eighty minutes. The solution was refluxed for 150 minutes. The Grignard reagent was added to a mixture of 55 grams of ether and 135 grams (0.22 mole) of tetrakis-(2,2,2-trifluoroethoxy)silane which was maintained at 100 degrees centigrade over a period of ninety minutes. The heating was continued for about sixteen hours. The Vigreux column was then removed and the apparatus fitted for vacuum distillation. After distillation a brownish solid remained in the reaction flask which was then treated with 150 milliliters of 20 percent hydrochloric acid solution and refluxed for two hours. Then the Vigreux column was attached in place of the reflux condenser and the material was distilled. There was thus obtained 87 grams of product boiling at 164–165 degrees centigrade having a refractive index $(n_D^{20})$ of 1.3170 and a density of 1.26. These values may be compared with the corresponding values of 165–166 degrees centigrade, 1.3013 and 1.47 grams per milliliter respectively for the starting material tetrakis-(2,2,2-trifluoroethoxy)silane. After considering the following analytical data, it is apparent that the fraction is a mixture of the desired isopropyl-tris-(2,2,2-trifluoroethoxy)silane and starting ortho silicate.

*Analysis.* — Calculated for $i-C_3H_7Si(OCH_2CF_3)_3$ $(CF_3CH_2O)_4Si$: C, 29.36, 22.66; H, 3.56, 1.90. Found: C, 26.65; H 2.90.

*Example 4.—Tris-(2,2,2-trifluoroethoxy)isopropylsilane*

The apparatus used was a graduated addition funnel (connected to a Y tube), to which a one-liter, two-necked flask, and a water condenser was joined. A Dry-Ice condenser was connected with the water condenser and the gas from it led through a calcium chloride tube into the absorbing solution. The apparatus was dried with a heating lamp and a current of dry nitrogen. Into the reaction flask was placed 370 grams (3.7 moles) of trifluoroethanol, which was then refluxed. To the alcohol was added in a dropwise manner 93 grams (0.52 mole) of isopropyltrichlorosilane. The reaction was continued until approximately the theoretical amount of hydrogen chloride was evolved, a period of about sixteen hours. The reaction mixture was then rectified. There was thus obtained about 171 grams (approximately 88.5 percent of the theoretical yield) of product, boiling at about 162–163 degrees centigrade/741.5 mm.

*Analysis.*—Calculated for $(CF_3CH_2O)_3Si-(i-C_3H_7)$: C, 29.36; H, 3.56. Found: C, 29.31; H, 3.53.

Among the other (lower-perfluoroalkyl substituted lower-alkoxy)alkylsilanes within the scope of the present invention which can be made by following the procedure of the preceding examples are:

$(C_2F_5CH_2O)_2Si(CH_3)_2$, $(C_3F_7CH_2O)_2Si(C_2H_5)_2$, $(C_4F_9C_2H_4O)_2Si(C_3H_7)_2$ $(C_2F_5CH_2O)_3SiCH_3$, $(C_3F_7CH_2O)_3SiC_2H_5$, $(C_4F_9CH_2CH_2O)_3SiC_3H_7$ $(C_6F_{13}CH_2O)_3SiC_5H_{11}$ $(C_7F_{15}CH_2CH_2CH_2O)_3SiCH(C_2H_5)_2$ $(C_5F_{11}CH_2O)_3SiCH(C_3H_7)_2$, $(CF_3C_4H_8O)_2Si(CH_3)_2$, and $(CF_3C_4H_8O)_3SiCH_3$ Thus, by reacting $(C_3F_7CH_2O)_4Si$ with $C_2H_5MgI$ and following the procedure of Example 1, the compounds $(C_3F_7CH_2O)_2Si(C_2H_5)_2$ and $(C_3F_7CH_2O)_3SiC_2H_5$ can be made.

By reacting $C_4F_9CH_2CH_2O_4Si$ with $C_3H_7MgCl$ and following the procedure of Example 3, the compound $(C_4F_9CH_2CH_2O)_3SiC_3H_7$ can be made.

And by reacting $CF_3C_4H_8OH$ with $Cl_3SiCH_3$ and following the procedure of Example 4, the compound $(CF_3C_4H_8O)_3SiCH_3$ can be made.

It is to be understood that the invention is not to be limited to the exact details of operation or exact compounds shown and described, as obvious modifications and equivalents will be apparent to one skilled in the art,

We claim:

1. A (lower-perfluoroalkyl-substituted-lower-alkoxy) alkylsilane having at least two lower-perfluoroalkyl-substituted-lower-alkoxy groups present.
2. A di - (lower-perfluoroalkyl)-lower-alkoxydialkylsilane.
3. A tri- (lower - perfluoroalkyl) - lower - alkoxy-monoalkylsilane.
4. Bis-(2,2,2-trifluoroethoxy)dimethylsilane.
5. Tris-(2,2,2-trifluoroethoxy)methylsilane.
6. Tris-(2,2,2-trifluoroethoxy)isopropylsilane.
7. Tris - (3,3,4,4,5,5,6,6,6-nonafluorohexoxy)propylsilane.
8. Bis-(2,2,3,3,4,4,4-heptafluorobutoxy)diethylsilane.
9. A compound of the formula $$(RCH_2O)_x SiR'_{4-x}$$

wherein R is a lower perfluoroalkyl radical, R' is an alkyl radical and $x$ is an integer from 2 to 3 inclusive.

OTHER REFERENCES

McBee et al.: "Jour. Amer. Chem. Soc.," vol. 77, March 1955, pages 1292–93.